US009804937B2

United States Patent
Huang et al.

(10) Patent No.: US 9,804,937 B2
(45) Date of Patent: Oct. 31, 2017

(54) BACKUP BACKPLANE MANAGEMENT CONTROL IN A SERVER RACK SYSTEM

(71) Applicant: Quanta Computer Inc., Taoyuan (TW)

(72) Inventors: Jen-Hsuen Huang, Taoyuan (TW); Fa-Da Lin, Taoyuan (TW); Pao-Ching Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 154 days.

(21) Appl. No.: 14/825,875

(22) Filed: Aug. 13, 2015

(65) Prior Publication Data

US 2016/0070627 A1    Mar. 10, 2016

Related U.S. Application Data

(60) Provisional application No. 62/047,499, filed on Sep. 8, 2014.

(51) Int. Cl.
*G06F 11/20* (2006.01)
*G06F 11/30* (2006.01)

(52) U.S. Cl.
CPC ...... *G06F 11/2025* (2013.01); *G06F 11/2035* (2013.01); *G06F 11/3058* (2013.01); *G06F 11/3062* (2013.01)

(58) Field of Classification Search
CPC ............. G06F 11/2035; G06F 11/2025; G06F 11/3058; G06F 11/3062
See application file for complete search history.

(56) References Cited

U.S. PATENT DOCUMENTS

| | | | |
|---|---|---|---|
| 6,795,885 B1* | 9/2004 | deBlanc | G06F 11/2007 361/729 |
| 9,110,805 B1* | 8/2015 | Tsai | G06F 11/0793 |
| 9,250,684 B1* | 2/2016 | Chen | G06F 1/3206 |
| 9,385,920 B1* | 7/2016 | Chen | H04L 43/10 |
| 9,582,010 B2* | 2/2017 | Mick | G05D 23/1917 |
| 9,690,569 B1* | 6/2017 | Yeh | G06F 8/65 |
| 2002/0054477 A1* | 5/2002 | Coffey | G06F 11/0727 361/679.45 |
| 2003/0182483 A1* | 9/2003 | Hawkins | G06F 9/4411 710/110 |
| 2003/0188051 A1* | 10/2003 | Hawkins | G06F 11/2025 710/15 |
| 2004/0228063 A1* | 11/2004 | Hawkins | G06F 13/4291 361/115 |
| 2005/0080887 A1* | 4/2005 | Lee | G06F 11/2025 709/223 |
| 2005/0271079 A1* | 12/2005 | Teoh | H04L 69/40 370/463 |
| 2006/0143498 A1* | 6/2006 | Hatasaki | G06F 11/2025 714/6.32 |
| 2008/0155300 A1* | 6/2008 | Yang | G06F 9/44505 714/1 |

(Continued)

*Primary Examiner* — Matt Kim
*Assistant Examiner* — Paul Contino
(74) *Attorney, Agent, or Firm* — Nixon Peabody LLP; Eduardo J. Quinones

(57) ABSTRACT

A server rack includes a rack management controller (RMC) configured to manage a first function and a backplane including a backplane controller (BPC). The BPC is configured to monitor the RMC, determine that the RMC is unavailable, and manage the first function, in response to determining that the RMC is unavailable.

18 Claims, 6 Drawing Sheets

(56) References Cited

U.S. PATENT DOCUMENTS

| | | | | |
|---|---|---|---|---|
| 2010/0180161 | A1* | 7/2010 | Kern | G06F 11/2028 714/47.2 |
| 2012/0136484 | A1* | 5/2012 | Wang | G06F 15/161 700/275 |
| 2013/0080840 | A1* | 3/2013 | Baba | G06F 11/3006 714/47.1 |
| 2013/0138803 | A1* | 5/2013 | Wang | H04L 43/0817 709/224 |
| 2013/0138979 | A1* | 5/2013 | Wang | H04L 12/6418 713/300 |
| 2013/0138997 | A1* | 5/2013 | Wang | H04L 41/0856 714/4.11 |
| 2013/0166713 | A1* | 6/2013 | Chiu | H04L 61/103 709/223 |
| 2013/0179718 | A1* | 7/2013 | Jau | G06F 1/263 713/340 |
| 2013/0201819 | A1* | 8/2013 | Hu | H04L 41/0668 370/219 |
| 2013/0322012 | A1* | 12/2013 | Dunwoody | G06F 1/20 361/679.53 |
| 2014/0074261 | A1* | 3/2014 | Wang | G06F 1/00 700/90 |
| 2014/0123121 | A1* | 5/2014 | Chiu | G06F 11/1433 717/168 |
| 2014/0229758 | A1* | 8/2014 | Richardson | G06F 11/2007 714/4.11 |
| 2014/0281614 | A1* | 9/2014 | Mick | G05D 23/1917 713/322 |
| 2014/0298091 | A1* | 10/2014 | Carlen | H04L 65/80 714/15 |
| 2015/0019711 | A1* | 1/2015 | Zhang | H04L 43/0817 709/224 |
| 2015/0052381 | A1* | 2/2015 | Zhang | G06F 11/3058 714/4.3 |
| 2015/0067084 | A1* | 3/2015 | Yeh | G06F 11/16 709/209 |
| 2015/0143159 | A1* | 5/2015 | Balogh | G06F 11/2007 714/4.11 |
| 2015/0199289 | A1* | 7/2015 | Tung | G06F 13/4291 710/316 |
| 2015/0363340 | A1* | 12/2015 | Kelly | G06F 13/102 710/52 |
| 2016/0070627 | A1* | 3/2016 | Huang | G06F 11/2035 714/4.12 |
| 2016/0072642 | A1* | 3/2016 | Shih | H04L 12/4666 370/392 |
| 2016/0099886 | A1* | 4/2016 | Rao | G06F 9/50 709/226 |
| 2016/0147276 | A1* | 5/2016 | Chen | H05K 7/1458 713/320 |
| 2016/0170923 | A1* | 6/2016 | Kutch | G06F 13/4282 710/313 |
| 2016/0245873 | A1* | 8/2016 | Lee | G01R 31/3651 |
| 2016/0356639 | A1* | 12/2016 | Chou | G06Q 10/083 |

* cited by examiner

BACKUP BACKPLANE MANAGEMENT CONTROL IN A SERVER RACK SYSTEM

CROSS-REFERENCE TO RELATED APPLICATIONS

This application claims the benefit of U.S. Provisional Patent Application Ser. No. 62/047,499 entitled "SYSTEMS AND METHODS FOR PROVIDING A MULTI-BACKUP MANAGEMENT CONTROL IN A SERVER SYSTEM", which was filed Sep. 8, 2014. The aforementioned application is herein incorporated by reference in its entirety.

BACKGROUND

Field

This application relates to managed computer systems, and more particularly to a system and method for backup management control in a server rack system.

Background

Computer server systems in modern data centers are commonly mounted in specific configurations on server racks for which a number of computing modules, such as trays, chassis, sleds, etc., are positioned and stacked relative on top of each other within the server racks. Server racks allow for a vertical arrangement of the computing modules to use space efficiently. Server racks commonly also include rack mounted fans, power supply units (PSUs), sensors, network cards, and other such hardware components. Server racks frequently include a rack management controller (RMC) for managing various functions such as fan control, power management, sensor management, and/or allowing remote management over a network.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method is provided for providing a backup management control system in a server rack. A rack management controller (RMC) of the server rack can manage a first function. A backplane controller (BPC) of a backplane in the server rack can manage the RMC. If the BPC determines that the RMC is unavailable, the BPC can manage the first function.

In some implementations, a system is provided for providing backup management control in a server rack. The system can include a RMC and a BPC. The RMC can be configured to manage a first function. The BPC can be configured to monitor the RMC, determine that the RMC is unavailable, and manage the first function, in response to determining that the RMC is unavailable.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for automatically determining a weight of a server rack. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects.

Traditionally, a server rack can include multiple server nodes and a management controller such as a rack management controller (RMC) for managing various functions such as fan control, power management, sensor management, and/or allowing remote management over a network. Some server racks can include a backplane to allow the RMC to manage the multiple server nodes though the backplane. However, the RMC, can in some situations, malfunction or becomes defective, disconnected, damaged, or otherwise unavailable. The subject matter of this application discloses a backplane controller (BPC) for a backplane of a server rack. The BPC can function as a backup management controller for the RMC to take over RMC functions in case the RMC becomes unavailable.

Figure 1:
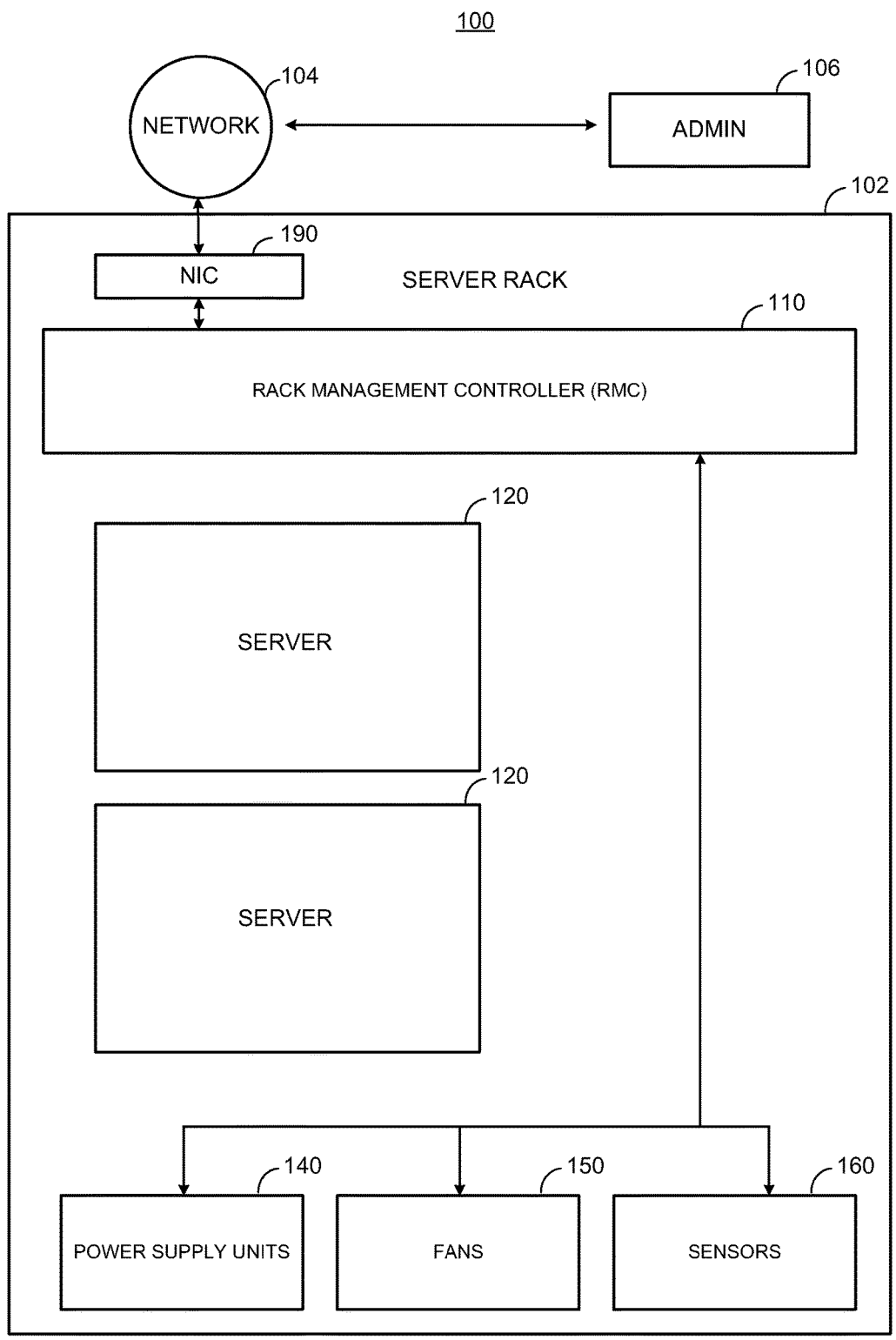
FIG. 1 illustrates a block diagram of an example server system including a rack management controller.

FIG. 1 illustrates a block diagram of an example server system 100 including a RMC 110. The system 100 can include a server rack 102 can with the RMC 110, multiple servers 120, as well as a number of other server rack components.

The RMC 110 of the server rack 102 can include a microcontroller that manages the entire server rack 102. The RMC 110 can monitor the health and status of the rack server using various sensors 160, manage server rack power supply units (PSUs) 140, server rack fans 150, as well as communicate over a network 104 with an administrator device 106. For example, the RMC 110 can report the health and status, system logs, or error messages to the administrator device 106. The RMC 110 can also receive commands from the administrator device 106, such as commands to change fan speeds of the fans 250, power on/off particular PSUs 240, etc.

For example, the sensors 160 can include devices that allow the RMC 110 to monitor the health and status of the server rack 102, such as temperature sensors, vibration sensors, and voltage sensors. The PSUs 140 can provide power to the servers 120 and other server rack components. PSUs 140 can be operated separately from the servers 120. The RMC 110 can control the PSUs 140 by monitoring the power needs of the server rack 102. The fans 150 can function to exhaust warm air from inside the server rack 102. The RMC 110 can control the fan speed of the fans 150 and/or turn on or off the fans 150 by monitoring temperature sensors in the server rack 102.

In some implementations, the RMC 110 can communicate with the various rack server components that the RMC 110 manages using the Intelligent Platform Management Interface (IPMI) protocol. IPMI is a set of specifications for an autonomous computer subsystem that manages and monitors a computer system's central processing unit (CPU), firmware, and operating system, and for out-of-band management and monitoring by system administrators. The RMC 110 can connect to the various server rack components using any bus interface such as the system management bus (SMBus), RS-232 serial bus, Inter-Integrated Circuit (IIC or I$^2$C) protocol, Ethernet, Intelligent Platform Management Bus (IPMB), etc. The IIC protocol features a multi-master, multi-slave, single-ended, serial computer bus that uses a Serial Data Line and a Serial Clock Line with a 7-bit or a 10-bit address space. The SMBus protocol features a single-ended, two-wire bus derived from IIC protocol and uses IIC hardware and IIC addressing.

The RMC 110 can connect to the network 104 using a network interface controller (NIC) 190. The NIC 190 of the server rack 102 can include computer hardware components that allow a computing device to communicate over the network 104. The NIC 190 can connect to the administrator device 106 through the network 104. The network 104 can, for example, include a local area network (LAN), wireless LAN (WLAN), or a wide area network such as the Internet. The network can be a telecommunications network that allows network nodes to exchange data along network links. For example, the network 104 can be an Ethernet, a type of wired LAN protocol described by a set of standards together called IEEE 802.3. The administrator device 106 can be a device such as a computer system that can send command or inputs to the RMC 110 as well as receive information from the RMC 110.

Figure 2:
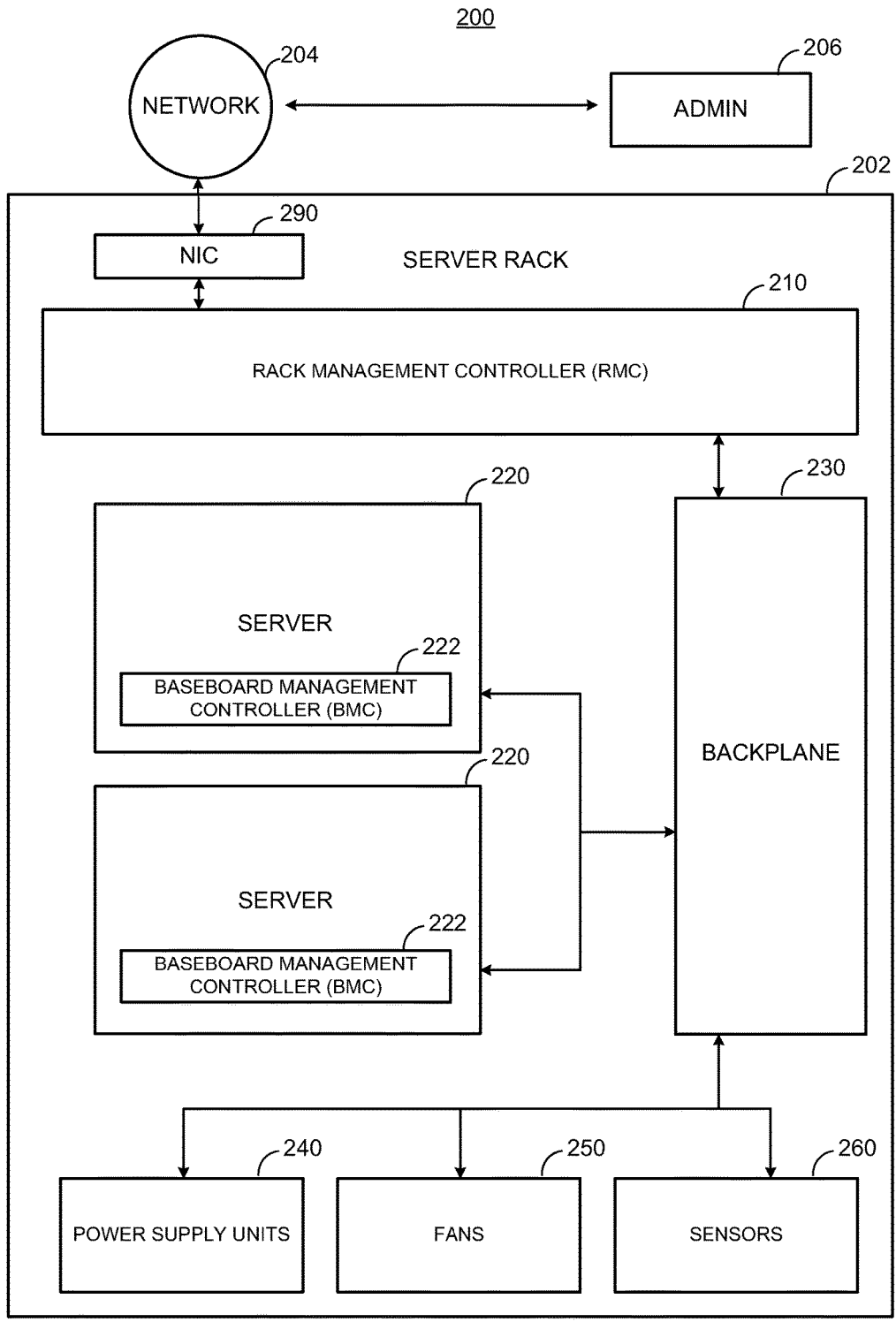
FIG. 2 illustrates a block diagram of an example server system including a backplane.

FIG. 2 illustrates a block diagram of an example server system 200 including a backplane 230. The system 200 can include a server rack 202 with a RMC 210, multiple servers 220, a backplane 230, as well as a number of other server rack components. In some implementations, the server system 200 can include one or more additional backplanes (not shown).

The RMC 210 of the server rack 202 can include a microcontroller that manages the entire server rack 202. In contrast to the system 100 of FIG. 1, the RMC 210 of system 200 can manage the servers 200 in addition to other server rack components. For example, the RMC 210 can monitor the health and operation of each of the servers 200, power on/off the servers 200, and relay communication between the servers 200 and the administrator device 206. The RMC 210 can communicate with the servers 220 as well as the other server rack components through the backplane 230. For example, the backplane 230 can communicatively couple to the RMC 210, the servers 220, the PSUs 240, the fans 250, the sensors 260, and other such server rack components. For implementations including one or more additional backplanes, each additional backplane can communicatively couple to the RMC 210, as well as a selected number of the servers 220, the PSUs 240, the fans 250, the sensors 260, and other server rack components.

The RMC 210 can monitor the health and status of the rack server using various sensors 260, manage server rack PSUs 240, server rack fans 250, as well as communicate over a network 204 with an administrator device 206. For example, the RMC 110 can report the health and status, system logs, or error messages to the administrator device 106. The RMC 110 can also receive commands from the administrator device 106, such as commands to change fan speeds of the fans 250, power on/off particular PSUs 240, etc.

For example, the sensors 260 can include devices that allow the RMC 210 to monitor the health and status of the server rack 202, such as temperature sensors, vibration sensors, and voltage sensors. The PSUs 240 can provide power to the servers 220 and other server rack components. The PSUs 240 can be operated separately from the servers 220. The RMC 210 can control PSUs 240 by monitoring the power needs of the server rack 202. The fans 250 can function to exhaust warm air from inside the server rack 202. The RMC 210 can control the fan speed of the fans 250 and/or turn on or off the fans 250 by monitoring temperature sensors in the server rack 202.

Each server 220 can include a separate baseboard management controller (BMC) 222. The each BMC 222 can include a microcontroller that manages interfaces between system management software and platform hardware. In some implementations, each BMC 222 can manage hardware components within each corresponding server 220, such as processors, memory, storage devices, PSUs, fans, boards, etc.

In some implementations, the RMC 210 and/or the backplane 230 can communicate with the servers 220 and the various rack server components that the RMC 210 manages using the Intelligent Platform Management Interface (IPMI) protocol. For example, the RMC 210 and/or backplane 230 can connect to the various server rack components using any bus interface such as the SMBus, RS-232 serial bus, I$^2$C protocol, Ethernet, IPMB, etc.

The RMC 210 can connect to the network 204 using a network interface controller (NIC) 290. The NIC 290 of the server rack 202 can include computer hardware components that allow a computing device to communicate over the network 204. The NIC 290 can connect to the administrator device 206 through the network 204. The network 204 can, for example, include a LAN or a wide area network such as the Internet. The administrator device 206 can be a device such as a computer system that can send command or inputs to the RMC 210 as well as receive information from the RMC 210.

Figure 3:
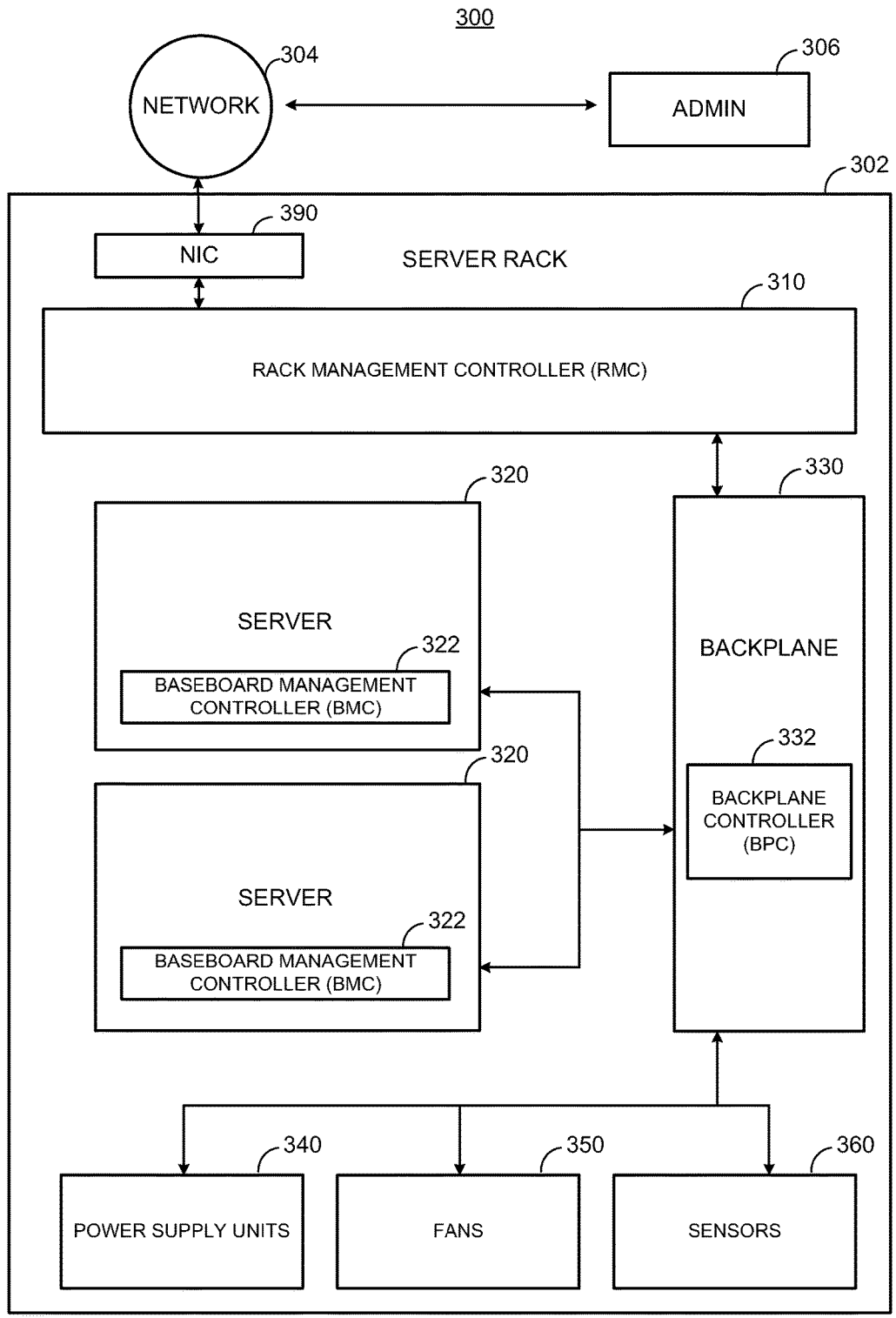
FIG. 3 illustrates a block diagram of an example server system for backup management control including a backplane management controller.

FIG. 3 illustrates a block diagram of an example server system 300 for backup management control including a backplane management controller (BPC) 332. The system 300 can include a server rack 302 with a RMC 310, multiple servers 320, a backplane 330 with the BPC 332, as well as a number of other server rack components. In some implementations, the server system 300 can include one or more additional backplanes (not shown).

In contrast to the system 200 of FIG. 2, the system 300 of FIG. 3 can include a BPC 332 in the backplane 330 and/or the one or more additional backplanes. In some implementations, the BPC 332 can be configured to have any or all of the functional capabilities of the RMC 310. The BPC 332 can remain dormant until it is needed, such as when the RMC 310 malfunctions or becomes defective, disconnected, damaged, or otherwise unavailable. In some implementations, the BPC 332 can monitor the RMC 310 to determine if and when the RMC 310 becomes unavailable. In response to determining that the RMC 310 is unavailable, the BPC 332 can take over the management functions from the RMC 310.

Similar to the RMC 310, the BPC 332 of the backplane 330 can include a microcontroller that manages the entire server rack 302. For example, the BPC 332 can monitor the health and operation of each of the servers 300, power on/off the servers 300, and relay communication between the servers 300 and the administrator device 306.

The BPC 332 can monitor the health and status of the rack server using various sensors 360, manage server rack PSUs 340, server rack fans 350, as well as communicate over a network 304 with an administrator device 306. For example, the RMC 310 can report the health and status, system logs, or error messages to the administrator device 306. The RMC 310 can also receive commands from the administrator device 306, such as commands to change fan speeds of the fans 350, power on/off particular PSUs 340, etc.

The RMC 310 of the server rack 302 can include a microcontroller that manages the entire server rack 302. For example, the RMC 310 can monitor the health and operation of each of the servers 300, power on/off the servers 300, and relay communication between the servers 300 and the administrator device 306. The RMC 310 can communicate with the servers 320 as well as the other server rack components through the backplane 330. For example, the backplane 330 can communicatively couple to the RMC 310, the servers 320, the PSUs 340, the fans 350, the sensors 360, and other such server rack components. For implementations including one or more additional backplanes, each additional backplane can communicatively couple to the RMC 310, as well as a selected number of the servers 320, the PSUs 340, the fans 350, the sensors 360, and other server rack components.

The RMC 310 can monitor the health and status of the rack server using various sensors 360, manage server rack PSUs 340, server rack fans 350, as well as communicate over a network 304 with an administrator device 306. For example, the RMC 310 can report the health and status, system logs, or error messages to the administrator device 306. The RMC 310 can also receive commands from the administrator device 306, such as commands to change fan speeds of the fans 350, power on/off particular PSUs 340, etc.

For example, the sensors 360 can include devices that allow the RMC 310 to monitor the health and status of the server rack 302, such as temperature sensors, vibration sensors, and voltage sensors. The PSUs 340 can provide power to the servers 320 and other server rack components. The PSUs 340 can be operated separately from the servers 320. The RMC 310 can control the PSUs 340 by monitoring the power needs of the server rack 302. The fans 350 can function to exhaust warm air from inside the server rack 302. The RMC 310 can control the fan speed of the fans 350 and/or turn on or off the fans 350 by monitoring temperature sensors in the server rack 302.

Each server 320 can include a separate baseboard management controller (BMC) 322. The each BMC 322 can include a microcontroller that manages interfaces between system management software and platform hardware. In some implementations, each BMC 322 can manage hardware components within each corresponding server 320, such as processors, memory, storage devices, PSUs, fans, boards, etc.

In some implementations, the RMC 310 can communicate with the servers 320 and the various rack server components that the RMC 110 manages using the Intelligent Platform Management Interface (IPMI) protocol. For example, the RMC 110 can connect to the various server rack components using any bus interface such as the SMBus, RS-232 serial bus, I²C protocol, Ethernet, IPMB, etc.

The RMC 310 can connect to the network 304 using a network interface controller (NIC) 390. The NIC 390 of the server rack 302 can include computer hardware components that allow a computing device to communicate over the network 304. The NIC 390 can connect to the administrator device 306 through the network 304. The network 304 can, for example, include a LAN or a wide area network such as the Internet. The administrator device 306 can be a device such as a computer system that can send command or inputs to the RMC 310 as well as receive information from the RMC 310.

Figure 4:
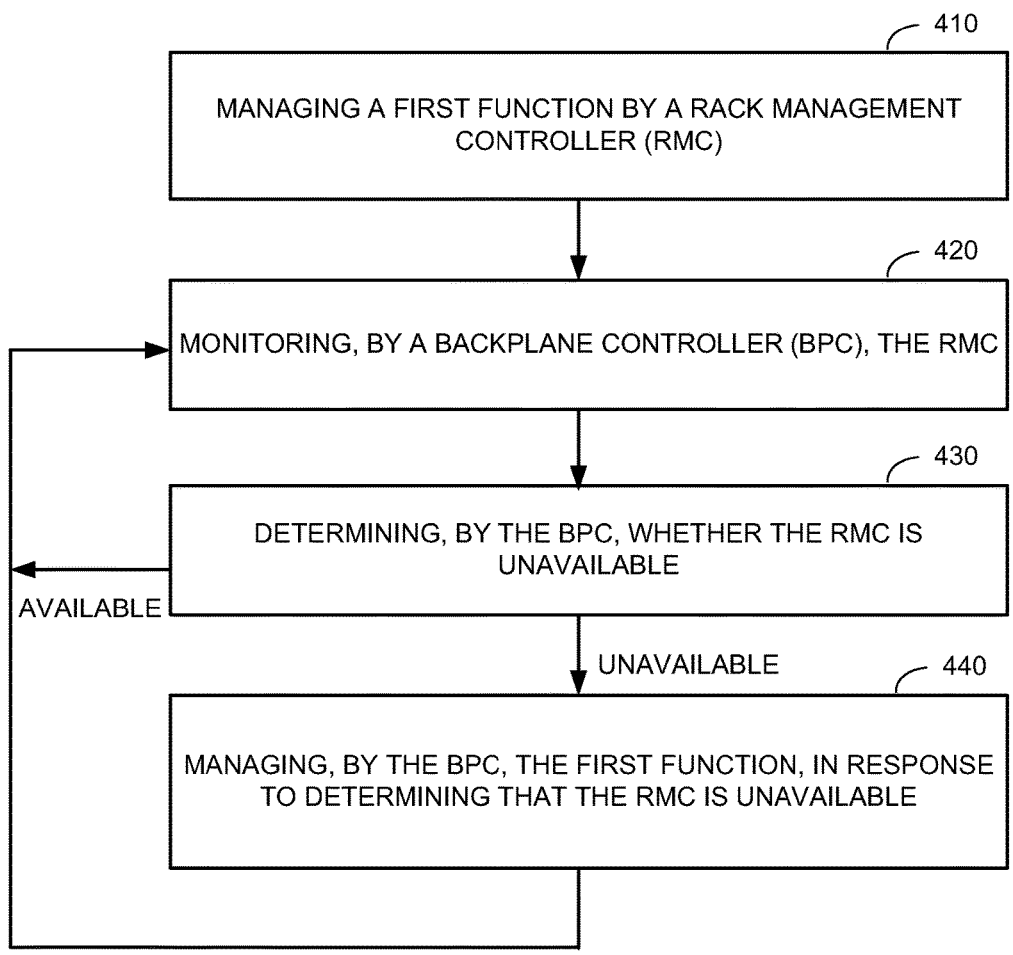
FIG. 4 illustrates an example method for backup management control in a server system.

FIG. 4 illustrates an example method 400 for backup management control in a server system. At step 410, a RMC of a server rack can manage a first function. In some implementations, first function can be PSU management, fan management, power consumption management, sensor and alarm management, or any other such management or control functions.

At step 420, a BPC of a backplane can monitor the RMC. In some implementations, the BPC can monitor signals from the RMC intended for other server rack components. In some implementations, the BPC can send a ping to the RMC and wait for a response ping from the RMC.

At step 430, the BPC can determine that the RMC is unavailable. In some implementations, the BPC determines that the RMC is unavailable, in response to receiving no signals from the RMC for a response threshold time. In some implementations, the BPC can determine that the RMC is unavailable, in response to receiving no ping response from the RMC for a ping threshold time. If, instead, the RMC is available, the method loops back to step 420, where the BPC monitors the RMC.

At step 440, the BPC can manage the first function in place of the RMC, in response to determining that the RMC is unavailable. In some implementations, the BPC can manage PSUs, fans, power consumption, sensors, alarms, or any other such management or control functions.

The method then loops back to step 420, where the BPC continues to monitor the RMC. If the RMC becomes available after being unavailable, the BPC can cease managing the first function. The RMC can then again manage the first function.

Figure 5:
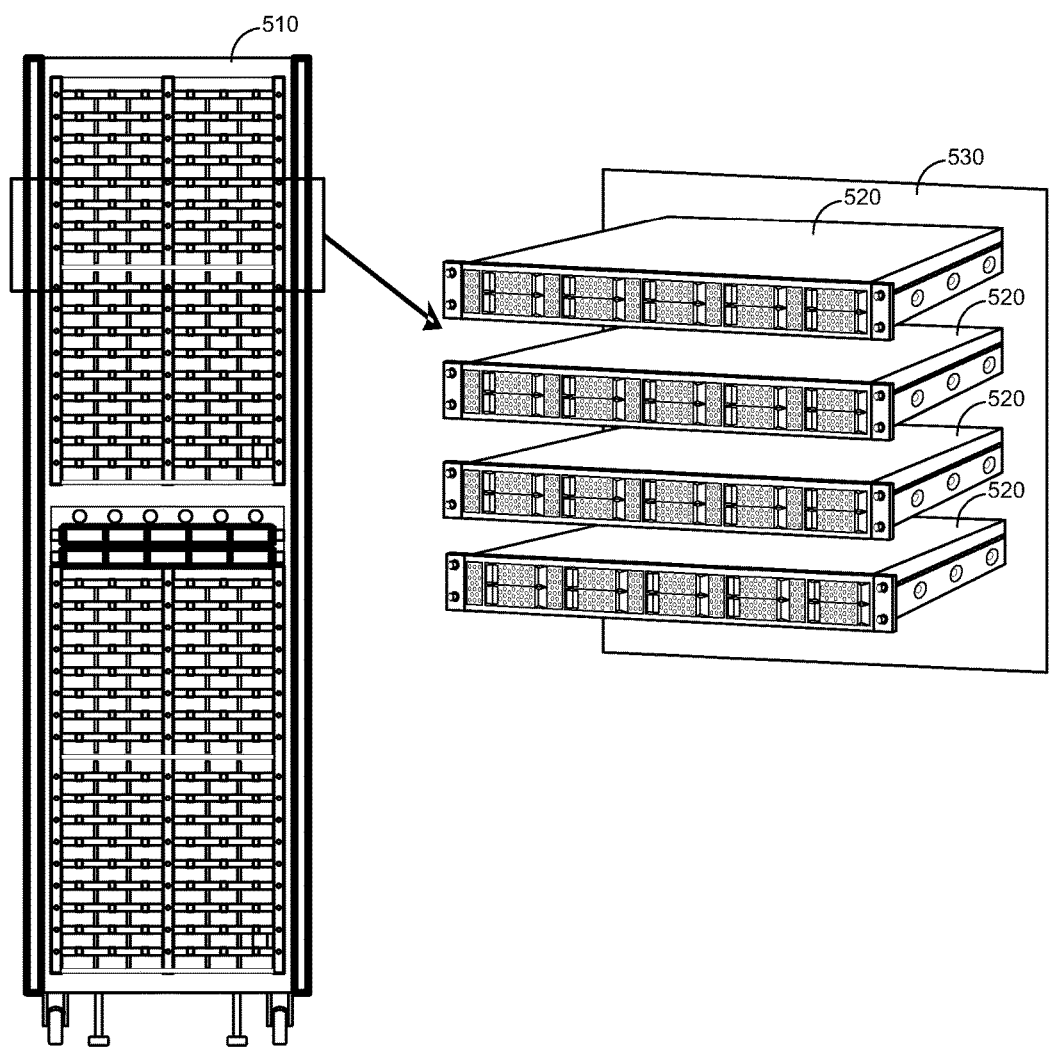
FIG. 5 illustrates an example server rack.

FIG. 5 illustrates an example server rack 510. The server rack can be a tower structure designed to reduce the space occupied by a large number of computer servers and other network equipment modules. Besides computer servers, many specialized network equipment are built to be mountable on server rack 510, such as storage drives, exchangers, routers, hardware firewalls, power supplies, etc.

The server rack 510 can be designed like a drawer enclosure with a number of sliding compartments (i.e., chassis) 520. The enclosure (i.e., internal) width of the server rack 510 can be 19 inches. The enclosure height of the server rack 510 is typically measured by the unit U (1 U is 1.75 inches or 44.45 millimeters). The enclosure height of the server rack can be 42 U (73.5 inches or 1.8669 meters). Although enclosure width and height is standardized, various server rack manufacturers can produce server racks with different external widths, heights, and depths. Chassis (i.e., sliding compartments) 520 can be mounted on the server rack 510. Common chassis that fit into the server rack 510 can each have a height of 1-7 U. Each chassis 520 can mount one or more computer server or other network equipment modules.

The server rack 510 can include one or more backplanes 530, located behind a set number of chassis 520 and at a rear of the server rack. The backplane 530 can be used as a part of a rear side of the server rack 510. The backplane 530 can include a number of connectors and cable management features. The backplane 530 can be removably attached to the rear of the server rack or can be rotably attached to the rear of the server rack via one or more hinges.

Figure 6:
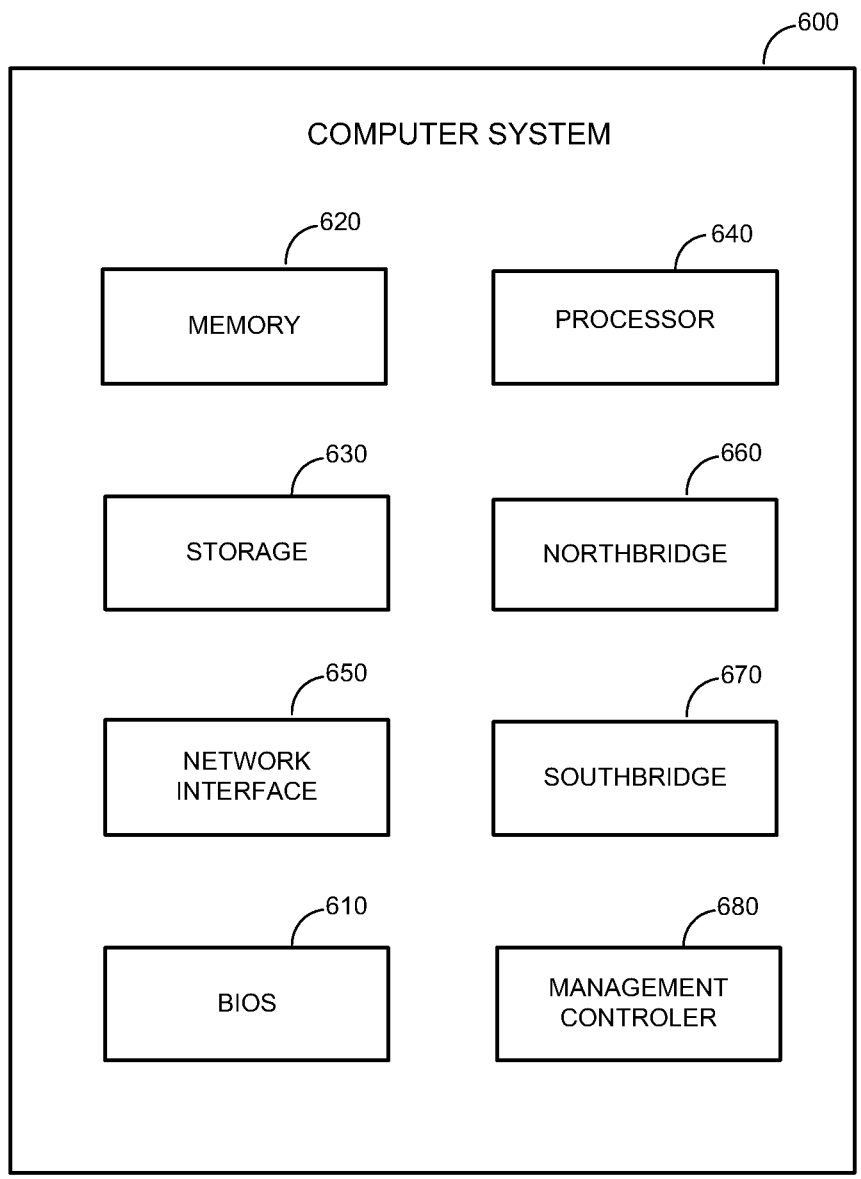
FIG. 6 illustrates a block diagram of an example computer system.

FIG. 6 illustrates a block diagram of an example computer system 600. The computer system 600 can include a processor 640, a network interface 650, a management controller 680, a memory 620, a storage 630, a BIOS 610, a northbridge 660, and a southbridge 670.

The computer system 600 can be, for example, a server (e.g., a server in a server rack of a data center) or a personal computer. The processor (e.g., central processing unit (CPU)) 640 can be a chip on a motherboard that can retrieve and execute programming instructions stored in the memory 620. The processor 640 can be a single CPU with a single processing core, a single CPU with multiple processing cores, or multiple CPUs. One or more buses (not shown) can transmit instructions and application data between various computer components such as the processor 640, memory 620, storage 630, and networking interface 650.

The memory 620 can include any physical device used to temporarily or permanently store data or programs, such as various forms of random-access memory (RAM). The storage 630 can include any physical device for non-volatile data storage such as a HDD or a flash drive. The storage 630 can have a greater capacity than the memory 620 and can be more economical per unit of storage, but can also have slower transfer rates.

The BIOS 610 can include a Basic Input/Output System or its successors or equivalents, such as an Extensible Firmware Interface (EFI) or Unified Extensible Firmware Interface (UEFI). The BIOS 610 can include a BIOS chip located on a motherboard of the computer system 600 storing a BIOS software program. The BIOS 610 can store firmware executed when the computer system is first powered on along with a set of configurations specified for the BIOS 610. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 610 can be loaded and executed as a sequence program each time the computer system 600 is started. The BIOS 610 can recognize, initialize, and test hardware present in a given computing system based on the set of configurations. The BIOS 610 can perform self-test, such as a Power-on-Self-Test (POST), on the computer system 600. This self-test can test functionality of various hardware components such as hard disk drives, optical reading devices, cooling devices, memory modules, expansion cards and the like. The BIOS can address and allocate an area in the memory 620 in to store an operating system. The BIOS 610 can then give control of the computer system to the OS.

The BIOS 610 of the computer system 600 can include a BIOS configuration that defines how the BIOS 610 controls various hardware components in the computer system 600. The BIOS configuration can determine the order in which the various hardware components in the computer system 600 are started. The BIOS 610 can provide an interface (e.g., BIOS setup utility) that allows a variety of different parameters to be set, which can be different from parameters in a BIOS default configuration. For example, a user (e.g., an administrator) can use the BIOS 610 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 680 can be a specialized microcontroller embedded on the motherboard of the computer system. For example, the management controller 680 can be a baseboard management controller (BMC). The management controller 680 can manage the interface between system management software and platform hardware. Different types of sensors built into the computer system can report to the management controller 680 on parameters such as temperature, cooling fan speeds, power status, operating system status, etc. The management controller 680 can monitor the sensors and have the ability to send alerts to an administrator via the network interface 650 if any of the parameters do not stay within preset limits, indicating a potential failure of the system. The administrator can also remotely communicate with the management controller 680 to take some corrective action such as resetting or power cycling the system to restore functionality.

The northbridge 660 can be a chip on the motherboard that can be directly connected to the processor 640 or can be integrated into the processor 640. In some instances, the northbridge 660 and the southbridge 670 can be combined into a single die. The northbridge 660 and the southbridge 670, manage communications between the processor 640 and other parts of the motherboard. The northbridge 660 can manage tasks that require higher performance than the southbridge 670. The northbridge 660 can manage communications between the processor 640, the memory 620, and video controllers (not shown). In some instances, the northbridge 660 can include a video controller.

The southbridge 670 can be a chip on the motherboard connected to the northbridge 660, but unlike the northbridge 660, is not directly connected to the processor 640. The southbridge 670 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 600. The southbridge 670 can connect to or can include within the southbridge 670 the management controller 670, Direct Memory Access (DMAs) controllers, Programmable Interrupt Controllers (PICs), and a real-time clock. In some instances, the southbridge 670 can directly connect to the processor 640, such as in the case where the northbridge 660 is integrated into the processor 640.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method, comprising:
 managing, by a rack management controller (RMC) of a server rack, a first function;
 monitoring, by a backplane controller (BPC) of a backplane in the server rack, the RMC, the BPC coupled to a plurality of baseboard management controllers (BMCs) of the server rack;
 determining, by the BPC, that the RMC is unavailable; and
 managing, by the BPC, the first function, in response to determining that the RMC is unavailable.

2. The method of claim 1, further comprising:
 determining, by the BPC, that the RMC is available; and
 ceasing management of the first function by the BPC, in response to determining that the RMC is available.

3. The method of claim 1, wherein monitoring comprises monitoring signals from the RMC, and the RMC is determined unavailable, in response to receiving no signals from the RMC for a response threshold time.

4. The method of claim 1, wherein monitoring comprises sending a ping to the RMC, and the RMC is determined unavailable, in response to receiving no ping response for a ping threshold time.

5. The method of claim 1, wherein monitoring comprises sending a ping to the RMC, and the RMC is determined unavailable, in response to receiving no response within a response threshold time.

6. The method of claim 1, wherein the first function comprises power supply unit management.

7. The method of claim 1, wherein the first function comprises fan management.

8. The method of claim 1, wherein the first function comprises power consumption management.

9. The method of claim 1, wherein the first function comprises sensor and alarm management.

10. A server rack, comprising:
 a rack management controller (RMC) configured to manage a first function; and
 a backplane comprising a backplane controller (BPC), the BPC coupled to a plurality of baseboard management controllers (BMCs) of the server rack,
 wherein the BPC is configured to:
  monitor the RMC,
  determine that the RMC is unavailable; and
  manage the first function, in response to determining that the RMC is unavailable.

11. The server rack of claim 10, wherein the BPC is further configured to:
 determine that the RMC is available; and
 cease management of the first function, in response to determining that the RMC is available.

12. The server rack of claim 10, wherein monitoring comprises monitoring signals from the RMC, and the RMC is determined unavailable, in response to receiving no signals from the RMC for a response threshold time.

13. The server rack of claim 10, wherein monitoring comprises sending a ping to the RMC, and the RMC is determined unavailable, in response to receiving no ping response for a ping threshold time.

14. The server rack of claim 10, wherein monitoring comprises sending a ping to the RMC, and the RMC is determined unavailable, in response to receiving no response within a response threshold time.

15. The server rack of claim 10, wherein the first function comprises power supply unit management.

16. The server rack of claim 10, wherein the first function comprises fan management.

17. The server rack of claim 10, wherein the first function comprises power consumption management.

18. The server rack of claim 10, wherein the first function comprises sensor and alarm management.

* * * * *